United States Patent [19]

Davis

[11] 3,758,564
[45] Sept. 11, 1973

[54] PROCESS FOR PREPARATION OF STRAIGHT CHAIN ALKANE DICARBOXYLIC ACIDS

[75] Inventor: Darwin Darrell Davis, Victoria, Tex.

[73] Assignee: E. I. du Pont de Nemours and Company, Wilmington, Del.

[22] Filed: July 8, 1971

[21] Appl. No.: 160,757

[52] U.S. Cl............................ 260/531 R, 260/537 P
[51] Int. Cl... C07c 55/02, C07c 55/14, C07c 51/18
[58] Field of Search...................... 260/531 R, 537 P

[56] References Cited
UNITED STATES PATENTS
3,637,832   1/1972   White et al. .................... 260/531 R Primary Examiner—Lorraine A. Weinberger
Assistant Examiner—Richard D. Kelly
Attorney—William A. Hoffman

[57] ABSTRACT

A process for preparation of a $C_8 - C_{12}$ dicarboxylic acid in high purity by oxidizing a cyclic ketone or alcohol or a mixture thereof in a reactor with aqueous nitric acid, with all reactants in the liquid phase, holding the substantially oxidized ketone or alcohol under oxidizing conditions to oxidize and remove undesired by-products, recovering the dicarboxylic acid from the nitric acid mother liquor which contains a minor amount of urea and/or ammonia and thereafter adding at least a stoichiometric amount of nitrous acid to the mother liquor and returning the mother liquor to the reactor.

4 Claims, 1 Drawing Figure

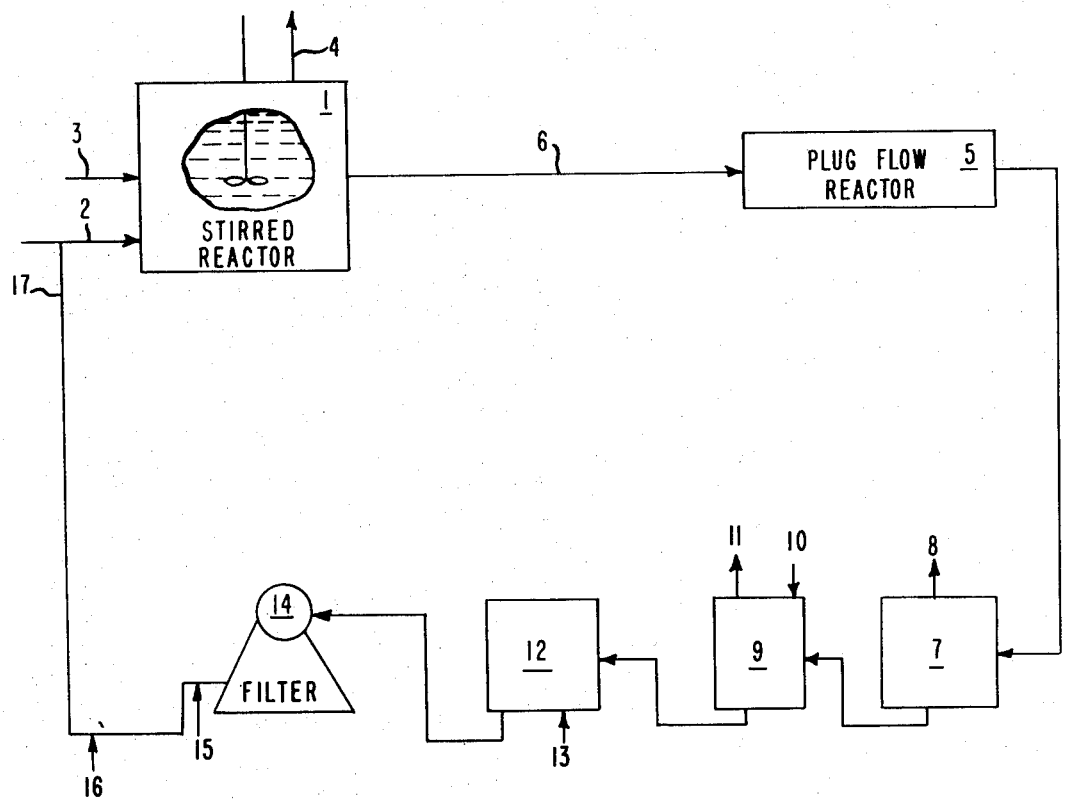

PROCESS FOR PREPARATION OF STRAIGHT CHAIN ALKANE DICARBOXYLIC ACIDS

BACKGROUND OF THE INVENTION

In co-pending application U.S. Ser. No. 712,542, filed Mar. 12, 1968, now U.S. Pat. No. 3,637,832, by J. O. White and D. D. Davis, there is described a process for preparing straight chain dicarboxylic acids in high purity by oxidizing a corresponding cyclic ketone or alcohol in aqueous nitric acid at an elevated temperature, maintaining the oxidate under oxidizing conditions for a further period after oxidation of the cyclic ketone or alcohol is substantially complete to reduce or eliminate certain organic nitrogenous impurities, followed by recovery of the desired dicarboxylic acids from the nitric acid mother liquor preferably by crystallization. The remaining mother liquor is thereafter returned to the reactor for subsequent oxidation cycles.

Because the dicarboxylic acid is subject to degradation in nitric acid which contains minor amounts of nitrous acid, a small amount of urea is added to the mother liquor during the recovery operation. In the return of the mother liquor containing urea to the reactor for reuse in the ketone/alcohol oxidation step, difficulties are encountered in that urea inhibits initiation of oxidation of the alcohol/ketone mixture. A safety hazard may also be incurred in that some of the urea is converted to ammonia with resultant build-up of ammonium nitrate in the oxidation system. Accordingly, an improved process in respect to operation and safety is desired.

STATEMENT OF INVENTION

The present invention provides an improved process for the preparation of straight-chain alkane dicarboxylic acids which comprises carrying out oxidation of a cyclic ketone or alcohol in aqueous nitric acid in a reactor followed by selective oxidation to reduce or eliminate by-products, especially organonitrogen impurities such as $\omega,\omega$-dinitrolauric acid, thereafter recovering the dicarboxylic acid from the nitric acid mother liquor to which is added urea to reduce oxidative degradation of the dicarboxylic acid, and finally adding nitrous acid to the residual mother liquor and returning it to the reactor for the further oxidation steps.

The cyclic ketones and alcohols include those having from eight to 12 carbon atoms such as cycloundecanol, cycloundecanone, cyclodecanol, cyclodecanone, cyclododecanol, cyclododecanone, cyclononal, cyclononanone, cyclooctanol and cyclooctanone.

The conditions of the oxidation are as described in Ser. No. 712,542 and include carrying out the oxidation in nitric acid of 40 to 60 percent concentration based on total water and acid and at a temperature in the range of 75° to 120°C. and at a pressure up to 7 atmospheres absolute. The further oxidation of the oxidate to remove the impurities is carried out at 90° to 110°C. for a period of 3 to 60 minutes.

The present invention may be illustrated by referring to the schematic drawing attached hereto and made a part of this specification. Nitric acid and catalyst, which can be in the form of a soluble copper or vanadium salt, are introduced into a stirred reactor 1 via line 2. The compounds to be oxidized, usually an alcohol and/or ketone, (e.g., cyclododecanol and cyclododecanone) are introduced via line 3. The gaseous effluent which consists of carbon oxides, nitrogen oxides, water, ketone and small amounts of alcohol and nitric acid are directed to a suitable recovery system via line 4. The liquid is discharged from the reactor 1 into reactor 5 via line 6. Reactor 5 is preferably operated under conditions of plug flow. The effluent from reactor 5 is then directed to a gas liquid separator 7 wherein carbon oxides, nitrogen oxides, water and nitric acid are removed via line 8. The liquid is directed to a bleacher 9 into which air is injected through 10 to further remove dissolved oxides of nitrogen via line 11. The liquid then is directed toward a crystallizer 12 into which urea in the form of an aqueous solution is introduced through line 13 and wherein most of the acid crystallizes. Solids are removed via filter 14. The solid is dissolved in fresh nitric acid containing urea and after further crystallization and filtering, the filtrate is added to the mother liquor stream via line 15. An aqueous solution of a nitrite salt such as sodium nitrite is introduced through line 16 and the mother liquor is returned to the stirred reactor 1 via line 17. The nitric acid which is present in the dibasic acid obtained from crystallizer 12 can be removed by washing in any manner similar to the techniques described in French Pat. Nos. 1,393,568 and 1,393,569.

The amount of urea added to the mother liquor for recovering the dicarboxylic acid, particularly by recrystallization, is such that its concentration in the mother liquor after completion of reaction with residual nitrous acid is in the range of 0.001 to 0.1 percent by weight.

The amount of nitrous acid added to the mother liquor prior to its being returned to the reactor, which can be introduced in the form of any suitable nitrite salt such as sodium nitrite, potassium nitrite or lithium nitrite or as NO, $NO_2$ or mixture thereof should be at least in a 2:1 mole ratio based on urea present and at least in a 1:1 mole ratio based on ammonia present in the mother liquor. Ammonium nitrate levels in the recycled mother liquor of up to about 1 percent can be expected. In general, the maximum amount of nitrous acid in the mother liquor recycled to the reactor would be about 2 percent.

As pointed in Ser. No. 712,542, the reactants are maintained in a homogeneous condition, i.e., in a substantially liquid phase both during the oxidation of the ketone and alcohol and during the oxidation of the nitrogenous impurities formed concomitantly with the acid.

DESCRIPTION OF PREFERRED EMBODIMENTS

In the preferred embodiment of this invention the concentration of urea in the nitric acid mother liquor for recovery of the desired dicarboxylic acid is in the range of 0.001 to 0.02 percent by weight. The amount of nitrous acid present in the mother liquor being returned to the reactor is preferably in at least a 4:1 mole ratio in respect to urea and in at least a 2:1 mole ratio in respect to ammonia.

A further preferred embodiment is that of oxidizing a mixture of cyclododecanol and cyclododecanone to produce substantially pure 1,12-dodecanedioic acid.

The invention is further illustrated in the following Examples, wherein parts and percentages are by weight unless otherwise specified.

EXAMPLE 1

This example illustrates the effect of the addition of sodium nitrite to the mother liquor to overcome the inhibiting effect of urea on the subsequent oxidation.

Thirty milliliters of typical mother liquor of line 17 in the figure containing approximately 50 percent nitric acid and about 10 percent of dissolved $C_4 - C_{12}$ organic dicarboxylic acids was charged into a 50 ml. flask. To this mixture there was added sufficient urea solution, (about 30 percent in water) to give a final urea concentration of 300 ppm. The mixture was heated to 98°C. after which there was added 0.1 ml. of a 25 percent solution of sodium nitrite. After momentary stirring there was injected into the solution 0.5 ml. of molten cyclododecanol/cyclododecanone. Within 1–2 seconds the oxidation had initiated, as indicated by the formation of off gas and oxides of oxygen.

In a repetition of the above experiment but with neither urea nor sodium nitrite introduced into the reaction flask a similar induction period of 1–2 seconds was observed.

EXAMPLE 2

This example illustrates the inhibiting effect of urea on initiation of oxidation. A mixture of 321 g. of typical mother liquor of line 17 in the figure containing 10.6 percent of organic dicarboxylic acids ($C_4 -_{C12}$) and 49.1 percent nitric acid (nitric + water basis) was treated with 0.5 ml. of a 30 percent solution of urea and water corresponding to a urea concentration of about 500 ppm., was placed in a 500 ml. flask and heated to 97°C. Thereafter with stirring there was injected quickly under the surface of the liquid, 1.0 ml. of molten cyclododecanol/cyclododecanone (about 90 percent and 7 percent respectively). No reaction was observed for a period of thirty seconds after which a color change occurred followed by oxidation at 35 seconds with evolution of oxides of nitrogen.

EXAMPLE 3

This example illustrates the effect of nitrous acid on depleting ammonia in the mother liquor.

A mixture typical of the mother liquor of line 17 in the figure, containing about 10 percent $C_4 - C_{12}$ a,ω-di-carboxylic acids and 48–50 percent nitric acid on a water + nitric acid basis, was continuously pumped through a stirred glass reactor so as to give a residence time of 20 minutes. The mixture also contained 1 percent of hydrolyzable nitrogen compounds (a), Determined by modified Kjeldahl analysis described in Kolthoff and Sandell, "Textbook of Quantitative Inorganic Chemistry," rev. ed., MacMillian Co., N.Y. (1949) p. 562, calculated as ammonium nitrate. The reactor was heated to 85°C., and a 30 percent solution of sodium nitrite in water was injected continuously at a variety of rates equal to several ratios of $NaNO_2/NH_4NO_3$. The concentration of ammonium nitrate in the effluent mixture, determined for each state, was found as shown in the following table. The efficiency of utilization of sodium nitrite was found to vary with the residence time, rate of addition, etc. since excess nitrous acid quickly decomposed and was lost as NO and $NO_2$ off-gas.

| Wt. Ratio $NaNO_2/NH_4NO_3$ | % $NH_4NO_3$ Remaining |
|---|---|
| 0.9 | 56 |
| 1.7 | 14 |
| 2.5 | 2 |
| 3.3 | <0.1 |

I claim:
1. In a process for the preparation of straight chain alkane dicarboxylic acids having from eight to 12 carbon atoms which acids are substantially free from organic nitrogenous impurities by contacting at least one cyclic compound selected from the group consisting of cyclic alcohols and cyclic ketones and mixtures thereof having eight to 12 carbon atoms with aqueous nitric acid having a concentration of 40 to 60 percent by weight based upon total water and nitric acid at a temperature in the range of 75 to 120°C. and at a pressure up to 7 atmospheres absolute, maintaining the reactants in the liquid phase during the oxidation of the cyclic compound and after substantially all of the cyclic compound has reacted, maintaining the oxidate under oxidizing conditions at a temperature in the range of 90° to 110°C. for a period of 3 to 60 minutes, thereafter recovering dicarboxylic acid substantially free from nitrogenous impurities from the nitric acid solution and returning the nitric acid mother liquor to the reactor; the improvement which comprises (a) introducing into the nitric acid solution containing nitrous acid and alkane dicarboxylic acid to be recovered an amount of urea to give a concentration after depletion of nitrous acid in the range of 0.001 to 0.1 percent by weight, (b) recovering from the nitric acid solution the dicarboxylic acid substantially free from nitrogenous impurities, and (c) introducing into the nitric acid mother liquor after recovery of the dicarboxylic acid and prior to return of the mother liquor to the reactor an amount of nitrous acid to provide a mole ratio of at least 2:1 based on urea and a mole ratio of at least 1:1 based on ammonia contained in the mother liquor.

2. The process of claim 1 wherein the concentration of urea in the mother liquor is in the range of 0.001 to 0.02 percent by weight.

3. The process of claim 2 wherein the amount of nitrous acid introduced into the mother liquor after recovery of the dicarboxylic acid and prior to return of the mother liquor to the reactor is in a mole ratio of at least 4:1 based on urea and at least 2:1 based on ammonia.

4. The process of claim 1 wherein the cyclic compound being contacted with nitric acid comprises at least one of the group consisting of cyclododecanol and cyclododecanone and the alkane dicarboxylic acid is 1,12-dodecanedioic acid.

* * * * *